United States Patent
Thibault

(10) Patent No.: US 8,022,297 B1
(45) Date of Patent: Sep. 20, 2011

(54) APPARATUS FOR INSTALLATION OF ELECTRICAL FLOOR BOXES

(75) Inventor: Steven C. Thibault, Harwinton, CT (US)

(73) Assignee: The Wiremold Company, West Hartford, CT (US)

( * ) Notice: Subject to any disclaimer, the term of this patent is extended or adjusted under 35 U.S.C. 154(b) by 152 days.

(21) Appl. No.: 12/396,974

(22) Filed: Mar. 3, 2009

Related U.S. Application Data

(60) Provisional application No. 61/033,192, filed on Mar. 3, 2008.

(51) Int. Cl.
*H02G 3/08* (2006.01)
(52) U.S. Cl. ............ 174/50; 174/58; 174/135; 439/535; 248/343
(58) Field of Classification Search ............ 174/50, 174/58, 57, 60, 135, 486; 439/535; 248/298.1, 248/343
See application file for complete search history.

(56) References Cited

U.S. PATENT DOCUMENTS

| | | | | |
|---|---|---|---|---|
| 4,140,293 A | * | 2/1979 | Hansen | 248/217.2 |
| 5,848,773 A | * | 12/1998 | Bourassa | 248/298.1 |
| 6,573,446 B1 | * | 6/2003 | Umstead et al. | 174/50 |
| 7,214,876 B1 | * | 5/2007 | Haberek et al. | 174/58 |
| 7,285,722 B2 | * | 10/2007 | Shyr | 174/58 |

* cited by examiner

*Primary Examiner* — Dhiru R Patel
(74) *Attorney, Agent, or Firm* — McCormick, Paulding & Huber LLP

(57) ABSTRACT

An electrical floor box assembly for installation in a floor structure includes an electrical floor box having a plurality of sidewalls and at least one clamp device attached to a sidewall so that the floor box may be mounted to a raised floor structure or leveled atop a support surface using the clamp device. The clamp device includes a clamp body, a threaded rod mounted for rotation along a longitudinal axis within the clamp body, and a clamp arm threadingly engaging the threaded rod so that it is movable along the rod in association with rotation thereof and can be moved into engagement with the undersurface of the floor structure to secure the floor box in place. The clamp device may further include a leveling subassembly for installation of the electrical floor box onto a support surface prior to construction of the floor around the leveled floor box.

14 Claims, 3 Drawing Sheets

APPARATUS FOR INSTALLATION OF ELECTRICAL FLOOR BOXES

CROSS REFERENCE TO RELATED APPLICATIONS

The present application claims priority to U.S. Provisional Application Ser. No. 61/033,192, filed Mar. 3, 2008, and hereby incorporates herein by reference the disclosures thereof.

FIELD OF THE INVENTION

The present invention generally relates to electrical floor boxes and, more particularly, to apparatus for installation thereof.

BACKGROUND

Electrical floor boxes are typically installed in a floor to house electrical components and provide a connection to electrical, communication and other wiring routed under and through the floor of a building structure. Such floor boxes generally must be mounted substantially flush with the upper surface of the floor. Various buildings have floors of different types, materials and thickness. For example, electrical floor boxes may be installed in a concrete floor, such as in an exhibition center, arena or office building, or in a joisted or raised floor, such as in a house. Some construction sites may utilize both concrete and raised floors. Each type of floor presents different requirements for positioning and mounting a floor box with respect to the floor. Currently, when floor boxes are installed, electricians must bring to the construction site multiple types of brackets, shims and mounting devices so as to be prepared to install floor boxes in either type of floor. If the electrician has the wrong equipment for installation of the box, the electrician may need to leave the construction site to obtain the proper installation devices, thereby resulting in added time for completion of a job.

Concrete floors are commonly constructed in a couple of manners. For example, a concrete floor can simply be poured onto a leveled dirt surface, such as for the ground level. Alternatively, the floor may be constructed by pouring concrete in steel forms, such as for upper levels of a building structure. Cable plenums for wiring the structure are typically pre-located on the leveled dirt or within the steel form structure, and are located under the floor once the concrete is poured. In order to connect to source power and signal cables running through such cable plenums, the plenums must be accessed by a hole formed through the concrete and the steel. Forming such a hole in an existing concrete floor for installing a floor box can be expensive, dirty, and disruptive to other uses of the area surrounding the intended in-floor box location. Thus, electrical floor boxes customarily are installed, prior to pouring the concrete floor, into pre-designated or pre-framed clearance holes where the boxes rest directly on the leveled dirt surface or within the steel form structure. Depending on floor thickness, different box wall heights may be required to bring an upper edge of the in-floor box level with the desired floor level. Additionally, with concrete floors, it is critical to ensure that the floor box is level before the concrete is poured so that the upper surface of the floor box is flush with upper surface of the concrete floor.

Electrical floor boxes also can be used in floor structures built with raised floor designs, such as board-on-joist floor designs. Board-on-joist floors can include traditional wood flooring as well as laminate, linoleum, carpeting, or other flooring material supported on a joisted sub-floor. In a board-on-joist floor design, cable plenums are located between the joists. A cable plenum under a board-on-joist floor can be accessed relatively quickly and without significant cost or disruption of the surrounding area. However, actually installing a floor box into an existing board-on-joist floor can be challenging. In particular, firmly fastening the box to the floor can be difficult because many flooring materials do not accept or retain conventional fasteners, or may interfere with penetration of fasteners into the sub-floor or joists. In particular, stone or ceramic tiles and some types of wood-finish resin laminates can frustrate most desirable methods of fastening a floor box in the floor. Ceramics are particularly frustrating because incautious fastening efforts can destroy the tile flooring. Fastening the floor box to the floor structure is further made more difficult by a desire to minimize secondary cuts or holes drilled in the flooring material, since each additional cut or hole further weakens and detracts from the appearance of the flooring material.

In view of the foregoing, there is a need for an effective and inexpensive device for locating an electrical floor box at an appropriate height above a steel form for concrete floors. Also, there is a need for an effective and inexpensive device for firmly attaching a floor box to a raised floor. Ideally, a single device capable of addressing both needs, especially a device that can be removably attached to the floor box and adjusted into desired position and orientation once attached, is desirable. Accordingly, it is a general object of the present invention to provide an electrical floor box assembly that overcomes the problems and drawbacks associated with installation of a floor box in a concrete floor structure as well as a raised floor structure.

SUMMARY OF THE INVENTION

In one aspect of the present invention, an electrical floor box assembly for installation in a floor structure includes an electrical floor box having a plurality of sidewalls and at least one clamp device attached to a sidewall of the floor box so that the floor box may be mounted to a raised floor structure or leveled atop a support surface using the clamp device. The clamp device includes a clamp body, a threaded rod mounted for rotation along a longitudinal axis within the clamp body, and a clamp arm threadingly engaging the threaded rod so that it is movable along the longitudinal axis of the rod in association with rotation thereof.

More particularly, the clamp arm of the clamp device is movable between a disengaged arm position and an engaged arm position. In the engaged arm position, the clamp arm protrudes outwardly from the clamp body and engages the undersurface of the floor structure. In the disengaged arm position, the clamp arm is substantially disposed within the clamp body such that the floor box can be inserted through an opening in the floor structure.

The clamp device may further include a leveling subassembly for installation of the electrical floor box onto a support surface. The leveling subassembly includes a locking nut mounted on a second end of the threaded rod such that rotation of the nut causes rotation of the threaded rod, which causes the clamp arm to move towards and engage an interior surface of the clamp body. When the clamp arm engages the clamp body in this manner, the amount of a first end of the threaded rod extending out of the clamp body may be adjusted by rotation of the threaded rod to level the floor box assembly.

In another aspect of the present invention, a clamp device for installation of an electrical floor box in a floor structure whereby the floor box may be mounted to a raised floor structure or leveled atop a support surface using the clamp device, includes a clamp body, a clamp arm, and a threaded rod mounted for rotation along a longitudinal axis within the clamp body. The clamp arm threadingly engages the threaded rod so that it is movable along the longitudinal axis of the rod in association with rotation thereof. The clamp device is adjustably attachable to a sidewall of the electrical floor box and may be positioned relative to the floor box in either a first rotational position or a second rotational position, wherein the second rotational position is a 180-degree rotation from the first rotational position. The clamp device, while in the first rotational position, is used to mount the floor box to a raised floor structure, and while in the second rotational position, the clamp device is used to level the floor box on a support surface. The position of the clamp device along a sidewall of the floor box may also be adjusted, and the clamp device can be secured to the floor box at a desired position.

These and other features of the present invention are described with reference to the drawings of preferred embodiments of an electrical floor box assembly. The illustrated embodiments of the electrical floor box assembly of the present invention are intended to illustrate, but not limit, the invention.

DETAILED DESCRIPTION OF EMBODIMENTS

Figure 1:
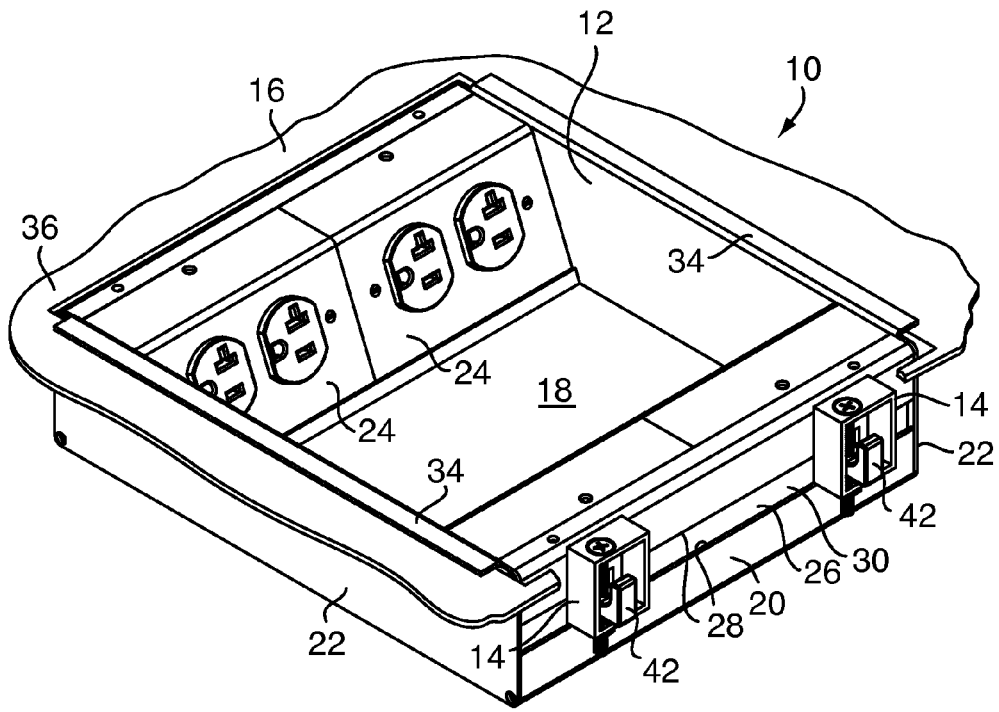
FIG. 1 is a perspective view of an electrical floor box assembly including an electrical floor box mounted beneath a floor using a clamp device in accordance with an embodiment of the present invention.
Figure 7:
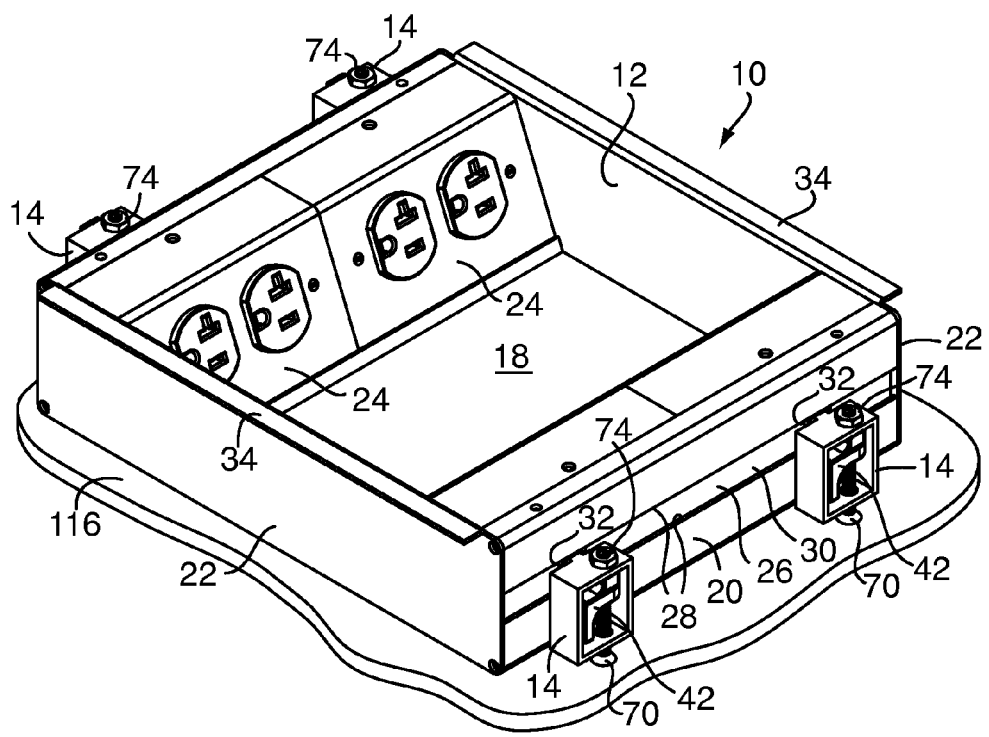
FIG. 7 is a perspective view of the electrical floor box assembly of FIG. 1 wherein the electrical floor box is mounted on a support surface using the clamp device of the present invention.

FIGS. 1 and 7 illustrate an electrical floor box assembly 10 in accordance with the present invention. The electrical floor box assembly 10 includes an electrical floor box 12 and a plurality of clamp devices 14 attached to the box 12 for securing the box to a floor structure 16 (FIG. 1) or for leveling the box on a support surface 116 (FIG. 7). In each mounting method, at least one clamp device 14 is used to secure and locate the box 12 in a desirable position and fit with respect to the upper surface of the floor 16, as described in more detail below, regardless of whether the box 12 is intended to be clamped beneath the floor surface or leveled on the support surface.

As shown in FIG. 1, the floor box 12 has a general box-like shape constructed from a bottom wall 18, generally opposed grooved sidewalls 20, and generally opposed flanged sidewalls 22, collectively defining an interior cavity of the box 12 which houses wiring components, such as electrical outlets, generally designated by reference numeral 24. As so designed, it is preferred to use four clamp devices 14, each generally located with respect to a corner edge of the box 12 to ensure balanced and secure installation of the box 12 with respect to the floor structure 16. More or less clamp devices 14 can be used as desired and depending on the installation conditions for the floor box 12, the shape and size of the floor box 12, and the structure of the floor into which the box is installed.

The clamp devices 14 are attached, and preferably secured, to one of the sidewalls of the box 12. As shown, the clamp devices 14 are attached to the grooved sidewalls 20. The clamp devices 14 can be attached to the box 12 using any known means of attachment, such as bolts, screws, rivets, adhesives, welds and the like. In a preferred design, each grooved sidewall 20 includes a T-shaped longitudinal channel 26 partially covered by lips 28 that form a slotted opening 30 on the outer face of the grooved sidewall 20 that receives a projection 32 on the clamp device 14. As further explained below, once the projection 32 is inserted into the channel 26, the clamp device 14 may be positioned at any desirable location along the grooved sidewall 20 and secured in place with a fastener (not shown). As intended by the present invention, any number of clamp devices 14 can be attached to the floor box 12 at any time prior to installation of the box, and then adjusted to a desired position along the sidewalls and in a desired orientation relative to the upper surface of the floor box 12. Further, the clamp devices 14 can be removed from the floor box, and replaced or reattached where necessary.

Each flanged sidewall 22 of the floor box 12 includes an outwardly extending flange 34 formed at an upward edge of the sidewall 22. When the box 12 is installed beneath a floor 16, as shown in FIG. 1, the flanges 34 are flush with the upper surface 36 of the floor 16.

Figure 2:
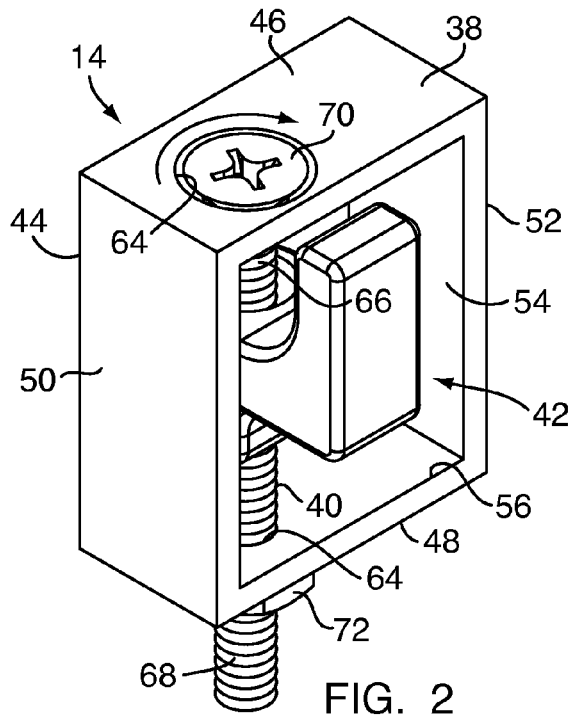
FIG. 2 is a front perspective view of the clamp device of FIG. 1 with an arm of the claim device in an engaged arm position.
Figure 3:
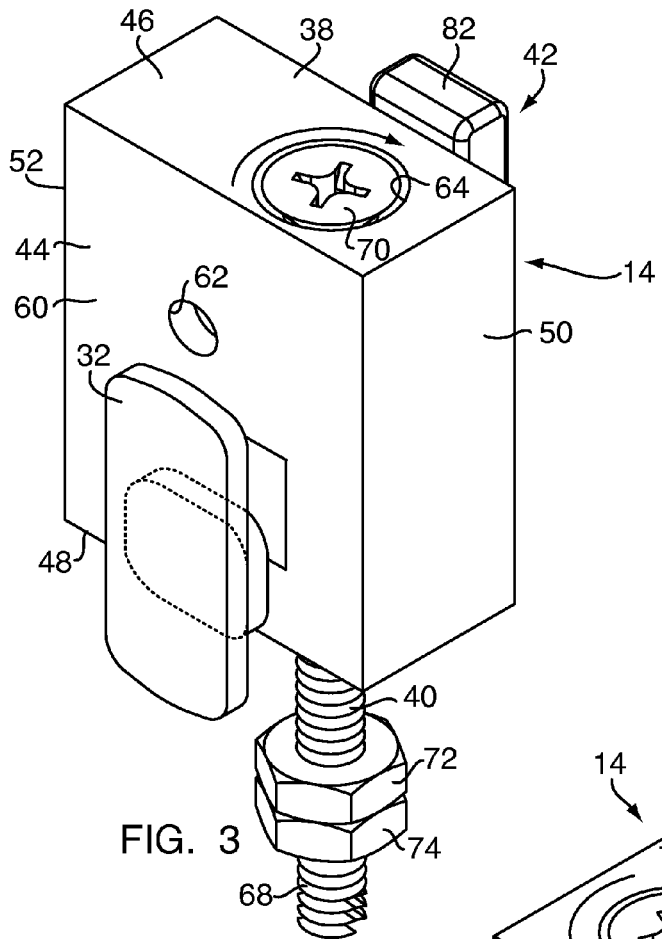
FIG. 3 is a rear perspective view of the clamp device of FIG. 1 with the arm in a fully-engaged arm position.
Figure 4:
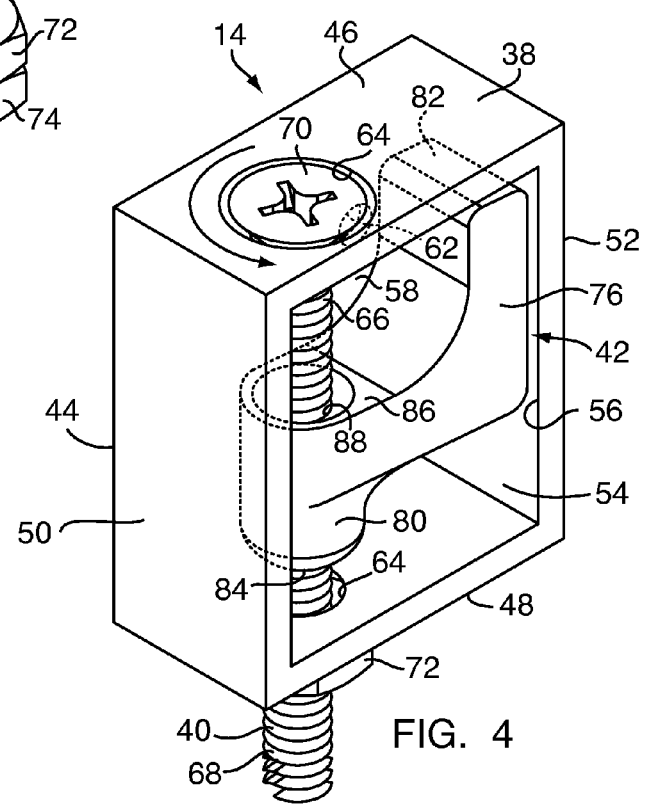
FIG. 4 is a front perspective view of the clamp device of FIG. 1 with the arm in a disengaged arm position.

Referring to FIGS. 2 through 4, each clamp device 14 includes a body 38, a threaded rod 40 rotatably mounted in the clamp body 38, and an arm 42 threadedly movable along the threaded rod 40.

Figure 6:
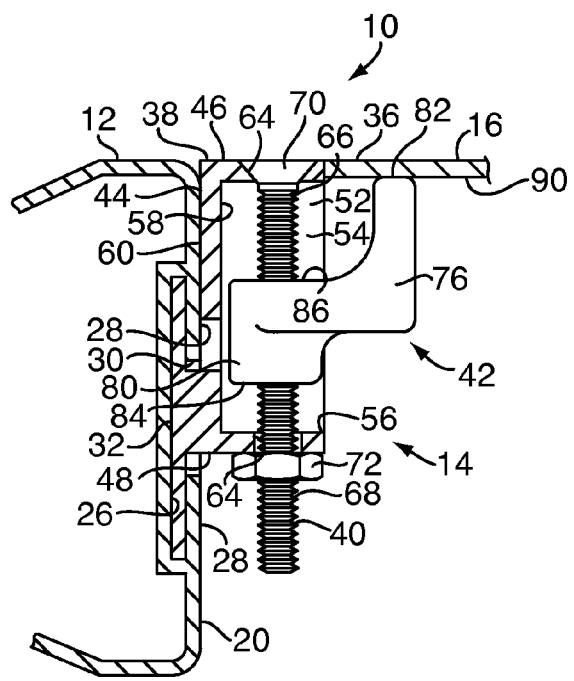
FIG. 6 is a partial cross-sectional view of the electrical floor box assembly of FIG. 1.

The clamp body 38 includes a back plate 44, generally opposed first and second end plates 46 and 48 and generally opposed first and second side plates 50 and 52 extending from the back plate 44 to collectively define an interior cavity 54 of the clamp body 38. The end plates 46, 48 and the side plates 50, 52 also collectively form an open forward surface and opening 56 generally opposite the back plate 44. The back plate 44 has a front side 58 and a back side 60, and includes a hole 62 for receiving a screw, a rivet, or a similar fastener for securing the clamp device 14 to the floor box 12. As shown in FIG. 3, the back plate 44 also includes the projection 32 protruding outwardly from the back side 60 thereof and shaped for insertion into the longitudinal channel 26 of the grooved sidewall 20. Preferably, the projection 32 has a shape that complements the cross-sectional shape of the channel 26 so as to ensure a snug fit of the projection 32 when inserted into the channel 26. As shown in FIG. 6, the projection 32 is flanged so as to closely interact with the back sides of the lips 28 formed on the grooved sidewalls 20.

To attach the clamp device 14 onto the floor box 12, the projection 32 is inserted into the slotted opening 30 anywhere along the channel 26. Preferably, the clamp device 14 is turned horizontally so that the longitudinal axis of the threaded rod 40 is generally parallel to the channel 26. With the projection 32 inserted into the channel 26, the clamp device can be slid along the channel 26 to a desired location. Once in a desired location, the orientation of the clamp device 14 can be adjusted, depending on the intended use for the clamp device. For example, the clamp device can be rotated 90 degrees in either direction so that it is either pointing up (FIG. 1) or pointing down (FIG. 7).

As noted above, each clamp device 14 can be adjusted along the channel 26 to a desired location. For example, as shown in FIGS. 1 and 7, each grooved sidewall 20 of the floor box 12 includes two clamp devices 14, each positioned adjacent a respective corner edge of the floor box 12. If only one clamp device 14 is needed for installation of the box 12, it could be slid to the center of the grooved sidewall 20 and secured into place with a fastener through the hole 62 in the clamp body 38. Preferably, the projection 32 is symmetrically shaped about the horizontal axis so that the clamp device 14 can be rotated 180-degrees to reorient the clamp device 14 relative to the floor box 12, as discussed in more detail below with respect to FIG. 7, without affecting the attachment of the clamp device 14 to the floor box 12.

The end plates 46, 48 of the clamp body 38 include coaxial rod holes 64 for receiving the threaded rod 40. The threaded rod 40 is vertically disposed within the clamp body 38 and rotatably mounted at generally opposed first and second ends 66 and 68 thereof by the rod holes 64 in the end plates 46 and 48. The first, upper end 66 of the threaded rod 40 includes a head 70 positioned adjacent to and extending out from the first end plate 46 of the clamp body 38. The head 70 is preferably slotted so that it can be rotated using a conventional screwdriver or similar device. The second, lower end 68 of the threaded rod 40 carries a capture nut 72 positioned adjacent to the second end plate 48 of the clamp body 38. The threaded rod head 70 and the capture nut 72 cooperate with the first and second end plates 46 and 48 to keep the threaded rod 40 mounted in the clamp body 38 while permitting the rod 40 to rotate about a longitudinal axis thereof. Optionally, a locking nut 74 can be installed on the second end 68 of the threaded rod 40 adjacent to or in lieu of the capture nut 72 for permitting one to rotate the threaded rod 40 from the second end thereof.

Figure 5A:
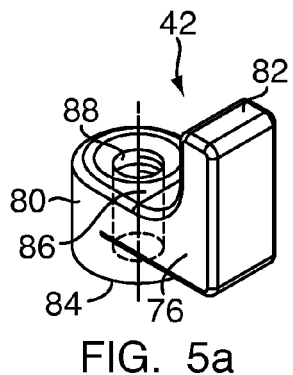
FIGS. 5A and 5B are perspective views of the arm used in the clamp device of FIG. 1.
Figure 5B:
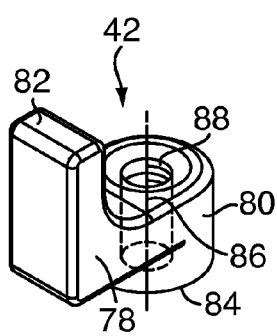

The clamp arm 42 is threaded onto the threaded rod 40 and movable along the longitudinal axis thereof within the clamp body 38 when the rod 40 is rotated. Referring to FIGS. 5A and 5B, the arm 42 has first and second side surfaces 76 and 78 joined by a cylindrical surface 80, first and second end surfaces 82 and 84, and an intermediate surface 86 substantially parallel to the two end surfaces. The arm 42 also includes a threaded channel 88 extending from the intermediate surface 86 through the second end surface 84, substantially parallel to the side surfaces 76 and 78. The threaded channel 88 is designed to receive the threaded rod 40 to mount the arm 42 within the clamp body 38. As so designed, the first end 82 of the arm 42 projects away from the threaded rod 40.

In operation, the threaded rod 40 cooperates with the threaded channel 88 formed through the arm 42 to move the arm 42 along the longitudinal axis of the threaded rod 40 between the first end plate 46 and the second end plate 48. The threaded rod 40 can be rotated within the clamp body 38 by turning the threaded rod head 70. For example, as the threaded rod 40 is turned clockwise (tightened) as illustrated in FIG. 2, the arm 42 will first pivot away from the back plate 44 of the clamp body 38 until the first side surface 78 of the arm contacts the adjacent side plate 50 of the clamp body 38. This is an engaged arm position of the clamp arm 42. With the first side surface 78 contacting against the side plate 50, the first end surface 82 of the arm 42 protrudes out and beyond the forward opening 56 of the clamp body 38. As the threaded rod 40 is further tightened, the arm 42 rides along the side plate 50 and travels upwardly along the threaded rod 40 toward the first end plate 46 until the intermediate surface 86 of the arm 42 contacts the first end plate 46. This fully-engaged arm position of the clamp arm 42 is illustrated in FIG. 3. With the intermediate surface 86 of the arm 42 contacting the first end plate 46 of the clamp body 38, the first end surface 82 of the arm 42 protrudes outwardly beyond the forward opening 56 and upwardly towards the first end plate 46 of the clamp body 38.

As the threaded rod 40 is turned counterclockwise (loosened), as illustrated in FIG. 4, the arm 42 pivots away from the side plate 50 and toward the back plate 44 until the second side surface 78 of the arm 42 contacts the forward edge of the first end plate 46. As the threaded rod 40 is further loosened, the arm 42 moves downwardly along the threaded rod 40 away from the first end plate 46 and toward the second end plate 48. During this motion, the second side surface 52 of the arm 42 slides past the forward edge of the first end plate 46 and can then pivot through the forward opening 56 into the interior cavity 54 of the clamp body 38. The arm 42 pivots further toward the back plate 44 so as to contact the front side 58 of the back plate 44. This is the disengaged arm position of the clamp arm 42. The threaded rod 40 can continue to be loosened in the disengaged arm position until the second end surface 84 contacts the second end plate 48 and is in a fully disengaged arm position.

For installing the floor box 12 in an opening made through the floor 16, as shown in FIG. 1, the clamp devices 14 are mounted to the floor box 12 by inserting the projection 32 of each clamp device 14 into one of the longitudinal channels 26, then positioning each clamp device 14 at a desired location along the channel 26, and orienting the clamp device 14 to an upwardly pointing first rotational position, specifically with the threaded rod head 70 directed toward the sidewall upper edge. All of the clamp arms 42 should be in a disengaged arm position so that they are housed within the interior cavity 54 of the clamp body 38 and do not project out through the forward opening 56 thereof. The floor box 12 is placed in the floor opening so that the box flanges 34 rest on and flush with the upper surface 36 of the floor structure 16, thus supporting the floor box 12. Once the floor box 12 is positioned as desired, each of the threaded rods 40 is tightened to bring the respective arm 42 into the engaged arm position and to draw the arm 42 toward the first end plate 46 of the respective clamp body 38, thereby bringing the first end surface 82 of each clamp arm 42 tightly against an under surface 90 of the floor 16 to secure the floor box 12 in position, as shown in FIG. 6.

If desired, the floor box 12 can be disengaged from the floor 16 by loosening the threaded rods 40 so that the clamp arms 42 disengage from the under surface 90 of the floor 16. The threaded rods 40 can be loosened to rotate and move the clamp arms 42 to a fully disengaged arm position, if desired, or at any disengaged location within the clamp body 38. As so adjusted, the floor box 12 may be removed and repositioned, and then the clamp devices 14 can be re-tightened to move the clamp arms 42 to engage the floor 16, as described above.

For installing the floor box 12 on top of a support surface 116, such as a leveled dirt surface before a concrete floor is poured around the floor box 12, as shown in FIG. 7, the clamp devices 14 are pre-assembled to the floor box 12 in the general manner discussed above. However, prior to pouring the concrete, the floor box 12 should be leveled on the support surface 116 so that the box's upper surface is flush with the concrete when it is poured. To level the floor box 12, the clamp devices 14 should be oriented in a downwardly facing rotational position, specifically with the threaded rod heads 70 facing downward. In accordance with the present invention, the clamp device 14 can be rotated after the projection 32 has been inserted into the channel 26 and the clamp device 14 has been located along the grooved sidewall 20, or the clamp device 14 can be rotated before inserting the projection 32 into the longitudinal channel 26. After the clamp device 14 has been rotated, the locking nut 74 is preferably fastened onto the second end 68 of the threaded rod 40 outside of or in lieu of the capture nut 72.

To level the floor box 12, it is placed on the support surface 116 so that the weight of the box 12 bears on the threaded rod heads 70. The weight of the box 12 presses the first end surface 82 of each arm 42 against the corresponding first end plate 46 to brace the clamp arm 42 within the clamp body 38. With the arm 42 so braced, rotation of the threaded rod 40 will cause the rod 40 to project out of the rod hole 64 in the first end plate 46. Each threaded rod 40 is rotated by turning the locking nut 74, and the amount of the threaded rod 40 protruding from first end plate 46 of the clamp body 38 to the support surface 116 can be adjusted, thereby leveling the floor box 12. Once the floor box 12 is positioned as desired, the floor can be constructed around the floor box 12, such as by pouring concrete to the level of the flanges 34 on the box 12.

One advantage of the present invention is that the clamp device 14 can be used for installing an electrical floor box 12 either in a raised floor structure (FIG. 1) or in a concrete floor (FIG. 7). Thus, the present invention enables electrical contractors to purchase fewer parts for all installations and keep at hand only one component for accomplishing various installations. This advantage reduces installation time and inventory.

Another advantage of the present invention is that the clamp device can be used to fasten the floor box to a floor without making additional holes for fasteners.

The foregoing description of embodiments of the present invention has been provided for the purpose of illustrated and description. It is not intended to be exhaustive or to limit the invention to the form disclosed. It will be understood by those skilled in the art that various changes and modifications in form and detail may be made without departing from the spirit and the scope of the invention. The embodiments described were chosen to best illustrate the principles of the invention and practical applications thereof to enable one of ordinary skill in the art to utilize the invention in various embodiments and with various modifications as suited to the particular use contemplated. It is intended that the scope of the invention be defined by the claims appended hereto.

What is claimed is:

1. An electrical floor box assembly, comprising:
    an electrical floor box having a plurality of sidewalls; and
    at least one clamp device attached to one of the plurality of sidewalls so that the floor box may be mounted to a raised floor structure or leveled atop a support surface using the clamp device, which includes:
        a clamp body;
        a threaded rod mounted for rotation along a longitudinal axis within the clamp body; and
        a clamp arm threadingly engaging the threaded rod so that it is movable along the longitudinal axis of the threaded rod in association with rotation thereof,
        wherein the clamp body includes a back plate, a forward opening opposite the back plate, at least one side plate disposed therebetween, and generally opposed upper and lower end plates, collectively defining an interior cavity of the clamp body; and
        wherein the clamp arm is disposed for movement along the threaded rod within the interior cavity of the clamp body.

2. The electrical floor box assembly according to claim 1, wherein the clamp arm is movable between a disengaged arm position and an engaged arm position such that in the disengaged arm position, the clamp arm is substantially disposed within the clamp body and in the engaged arm position the clamp arm protrudes outwardly from the clamp body through the forward opening thereof.

3. The electrical floor box assembly according to claim 2, wherein in the engaged arm position, the clamp arm engages an undersurface of the raised floor structure.

4. The electrical floor box assembly according to claim 1, wherein rotation of the threaded rod in a first rotational direction causes the clamp arm to pivot toward and ride along the at least one side plate toward the upper end plate, and rotation of the threaded rod in a second opposite direction causes the clamp arm to pivot away from the at least one side plate and ride along the back plate away from the upper end plate.

5. The electrical floor box assembly according to claim 1, wherein at least one of the sidewalls of the electrical floor box has an outwardly protruding flange that engages an upper surface of the raised floor structure.

6. An electrical floor box assembly, comprising:
    an electrical floor box having a plurality of sidewalls; and
    at least one clamp device attached to one of the plurality of sidewalls so that the floor box may be mounted to a raised floor structure or leveled atop a support surface using the clamp device, which includes:
        a clamp body;
        a threaded rod mounted for rotation along a longitudinal axis within the clamp body;
        a clamp arm threadingly engaging the threaded rod so that it is movable along the longitudinal axis of the threaded rod in association with rotation thereof; and
        a leveling subassembly for installation of the electrical floor box onto the support surface,
    wherein the clamp body includes a back plate, a forward opening opposite the back plate, at least one side plate disposed therebetween, and generally opposed first and second end plates comprising coaxial openings, collectively defining an interior cavity of the clamp body;
    the threaded rod having a first end extending through the opening in the first end plate and a second end extending through the opening in the second end plate;
    the clamp arm being disposed for movement along the threaded rod within the interior cavity of the clamp body;
    wherein the leveling subassembly comprises a locking nut mounted on the second end of the threaded rod such that rotation of the nut causes rotation of the threaded rod which causes the clamp arm to move towards and engage the first end plate; and
    further wherein, when the clamp arm engages the first end plate, the amount of the threaded rod extending through the opening in the first end plate may be adjusted by rotation of the threaded rod.

7. An electrical floor box assembly for installation in a floor structure, comprising:
    an electrical floor box having a plurality of sidewalls; and
    at least one clamp device attached to a sidewall of the floor box so that the floor box may be mounted to a raised floor structure or leveled atop a support surface using the clamp device, wherein said clamp device includes a projection adapted to slidingly engage into a channel formed in one of the plurality of sidewalls.

8. The electrical floor box assembly according to claim 7, wherein the engagement between the projection on the clamp device and the channel in the floor box sidewall permits the clamp device to be rotated about an axis of the projection so that the clamp device may be positioned in either a first rotational position or a second rotational position, wherein the second rotational position is a 180 degree rotation from the first rotational position.

9. The electrical floor box assembly according to claim 8, wherein the clamp device, while in the first rotational position, is used to mount the floor box to the raised floor structure, and while in the second rotational position, is used to level the floor box on the support surface.

10. The electrical floor box assembly according to claim 9, wherein the clamp device comprises:
   a clamp body;
   a threaded rod mounted for rotation along a longitudinal axis within the clamp body; and
   a clamp arm threadingly engaging the threaded rod so that it is movable along the longitudinal axis of the threaded rod in association with rotation thereof;
   wherein said clamp device, while in the first position, attaches the floor box to the raised floor structure by rotating the threaded rod to move the clamp arm into engagement with the under surface of the floor structure, and while in the second position, levels the floor box on the support surface by rotating the threaded rod to adjust the amount of the rod extending out of the clamp body while a head thereby contacts the support surface.

11. An electrical floor box assembly comprising:
   an electrical floor box having a plurality of sidewalls; and
   a clamp device including a clamp body, a clamp arm, and a threaded rod mounted for rotation along a longitudinal axis within the clamp body,
   wherein the clamp arm threadingly engages the threaded rod so that it is movable along the longitudinal axis of the threaded rod in association with rotation thereof,
   wherein the clamp body includes a back plate, a forward opening opposite the back plate, at least one side plate disposed therebetween, and generally opposed first and second end plates, collectively defining an interior cavity of the clamp body;
   wherein the clamp arm is disposed for movement along the threaded rod within the interior cavity of the clamp body; and
   further wherein rotation of the threaded rod in a first rotational direction causes the clamp arm to pivot toward and ride along the at least one side plate toward the first end plate, and rotation of the threaded rod in a second opposite direction causes the clamp arm to pivot away from the at least one side plate and ride along the back plate away from the first end plate.

12. The electrical floor box assembly according to claim 11, wherein a portion of the threaded rod extending through the first end plate is adjustable by rotation of the threaded rod when the clamp arm within the clamp body contacts the inner surface of the first end plate and a nut disposed on an opposite end of the threaded rod is turned to effect rotation of the threaded rod.

13. A clamp device for installing an electrical floor box in a floor structure whereby the floor box may be mounted to a raised floor structure or leveled atop a support surface using the clamp device, said clamp device comprising:
   a clamp body;
   a clamp arm;
   and a threaded rod mounted for rotation along a longitudinal axis within the clamp body;
   wherein the clamp arm threadingly engages the threaded rod so that it is movable along the longitudinal axis of the rod in association with rotation thereof;
   wherein the clamp device is adjustably attachable to a sidewall of the electrical floor box and may be positioned relative to the floor box in either a first rotational position or a second rotational position, the second rotational position being a 180-degree rotation from the first rotational position;
   wherein, when the clamp device is in the first rotational position, it is used to mount the floor box to a raised floor structure, and, when the clamp device is in the second rotational position, it is used to level the floor box on a support surface; and
   wherein the clamp body includes a projection protruding outwardly therefrom for engaging a channel in a sidewall of the electrical floor box, said projection including flanges for attaching the clamp device to the floor box in either of the first rotational position or the second rotation position.

14. The clamp device according to claim 13, wherein the position of the clamp device along the sidewall to which it is attached is adjustable.

* * * * *